(12) United States Patent
Lentini et al.

(10) Patent No.: US 6,406,187 B1
(45) Date of Patent: Jun. 18, 2002

(54) GREASE LOCK SEAL

(75) Inventors: Anthony G. Lentini, St. Clair Shores; Glenn F. Gehrke, Davisburg; Paul Bragan, Clarkston, all of MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 38 days.

(21) Appl. No.: 09/685,760

(22) Filed: Oct. 9, 2000

(51) Int. Cl.$^7$ ................................................ F16C 33/78
(52) U.S. Cl. ....................... 384/486; 384/569; 384/905.1
(58) Field of Search ................................. 384/569, 486, 384/905.1, 564, 484

(56) References Cited

U.S. PATENT DOCUMENTS 3,906,746 A * 9/1975 Haines ........................ 384/482
4,553,858 A * 11/1985 Neugebauer et al. ........ 384/473
5,626,519 A * 5/1997 Joyner .......................... 384/551

* cited by examiner

*Primary Examiner*—Lenard A. Footland
(74) *Attorney, Agent, or Firm*—Carlson Gaskey & Olds

(57) ABSTRACT

A grease lock seal with sealing lips angled inwardly towards the internal bearing components is press fit into a bearing cup assembly to prevent grease from being purged due to centrifugal forces introduced during the rotational operation of the system. As the plurality of sealing lips retain grease in the system, the system does not have to be re-greased. If one desires to re-grease the system, the grease lock seal can further include a plurality of grease purge channels which create a path for used grease to be purged. As internal pressure increases during regreasing, the used grease flows through the grease purge channels and out of the system. However, the grease purge channels are small enough so that grease does not escape from the system during normal operation.

17 Claims, 3 Drawing Sheets

GREASE LOCK SEAL

BACKGROUND OF THE INVENTION

The present invention relates generally to a grease lock seal for use with a universal joint on a vehicle drive shaft.

Typically, in a universal joint bearing, the sealing lips of a grease seal are angled away from the internal bearing components. When the system is re-greased, the internal pressure increases and the sealing lips flex open and lose contact with the sealing surface, allowing grease to purge from the system.

Grease is also purged from the system as centrifugal forces are introduced as the drive shaft spins. The pressure increases as the system rotates, and the sealing lips flex open and lose contact with the sealing surface and allow grease to escape from the system.

Also, at times the ability to replace the internal grease is desirable due to customer demand or because the vehicle operates under off road conditions which accumulates unwanted dirt and debris in the grease. It is therefore desirable to have a purge mechanism in the grease seal to allow old grease to escape.

Hence, there is a need in the art for a grease lock seal for use with a vehicle drive shaft which retains grease in the system.

SUMMARY OF THE INVENTION

An inventive embodiment includes a grease lock seal for use with a universal joint on a vehicle drive shaft.

In a preferred embodiment, a grease lock seal is press fit on a vehicle universal joint cross-member and includes a seal portion and a metal housing. The seal portion includes a plurality of sealing lips angled inwardly towards the internal bearing components and a shoulder seal which prevents contaminants from contacting the plurality of sealing lips. The seal portion substantially contacts the outer bearing surface of a trunnion and the metal housing substantially contacts the inner bearing surface of a bearing cup. Because the sealing lips are angled upwardly towards the bearing components, grease does not purge from the system as the internal pressure increases due to the addition or grease or due to centrifugal forces which are introduced during the rotational operation of the system. Therefore, the system does not have to be re-greased.

An alternative embodiment of the invention allows for the option of re-greasing. A plurality of grease purge channels are formed into the metal housing and form a path for grease to be purged from the system. As the internal pressure increases during regreasing, the used grease flows through the grease purge channels and out of the system. The grease purge channels are small enough so that grease does not escape from the system during normal operations.

Accordingly, the present invention provides a grease lock seal for use with a universal joint of a vehicle drive shaft.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
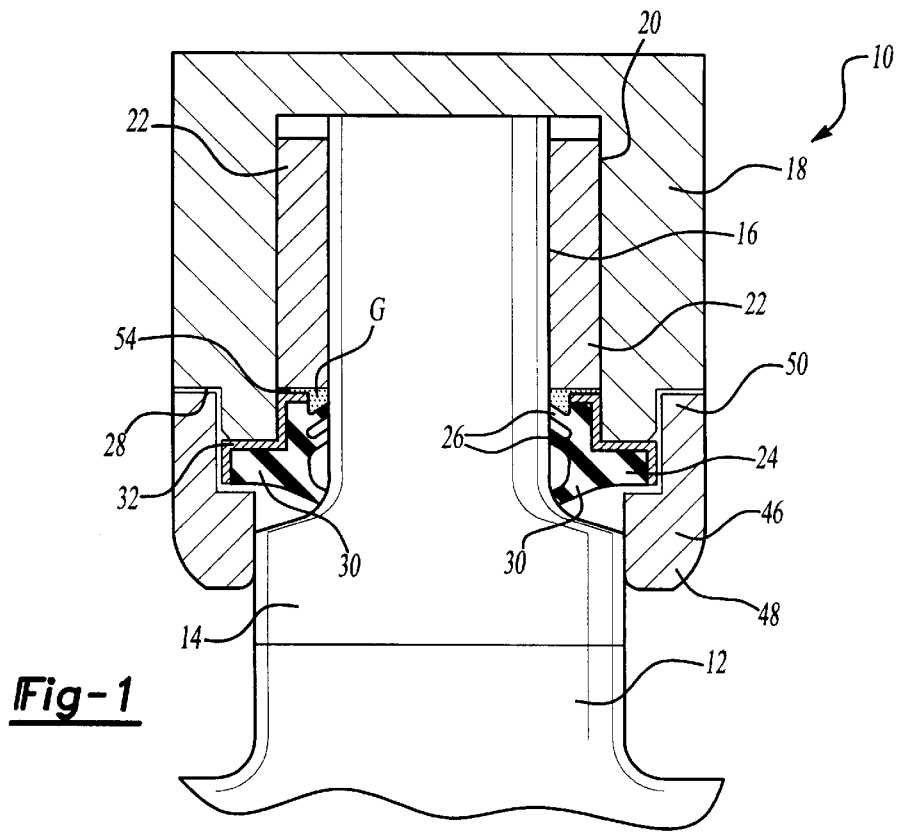
FIG. 1 illustrates a sectional elevational view of one of the bearing cups assemblies utilizing the grease lock seal of the present invention.

While the invention may be susceptible to embodiments in different forms, there is shown in the drawings, and herein will be described in detail, specific embodiments with the understanding that the present disclosure is to be considered an exemplification of the principles of the invention, and is not intended to limit the invention to that as illustrated and described herein.

Referring now to the drawings, FIG. 1 illustrates a bearing cup assembly 10. The bearing cup assembly 10 is attached to a leg of a cross 12, the cross having four legs disposed at rights angles relative to one another. As known, the cross 12 is part of a universal joint. Each bearing cup assembly 10 includes a generally cylindrical trunnion 14 having an outer bearing surface 16, and a hollow cylindrical bearing cup 18 having an inner bearing surface 20. The trunnion 14 is mounted on the bearing cup 18 such that the inner bearing surface 20 of the bearing cup 18 is disposed co-axially about the outer bearing surface 16 of the trunnion 14.

The diameter of the inner bearing surface 20 of the bearing cup 18 is larger than the diameter of the outer bearing surface 16 of the trunnion 14. A plurality of needle roller bearings 22 are arranged circumferentially in the spaced disposed therebetween, allowing the bearing cup 18 to rotate about the trunnion 14. An annular grease lock seal 24 provided about an open end 28 of the bearing cup 18 is utilized to store grease in the bearing cup assembly 10 and lubricate the components.

Figure 2:
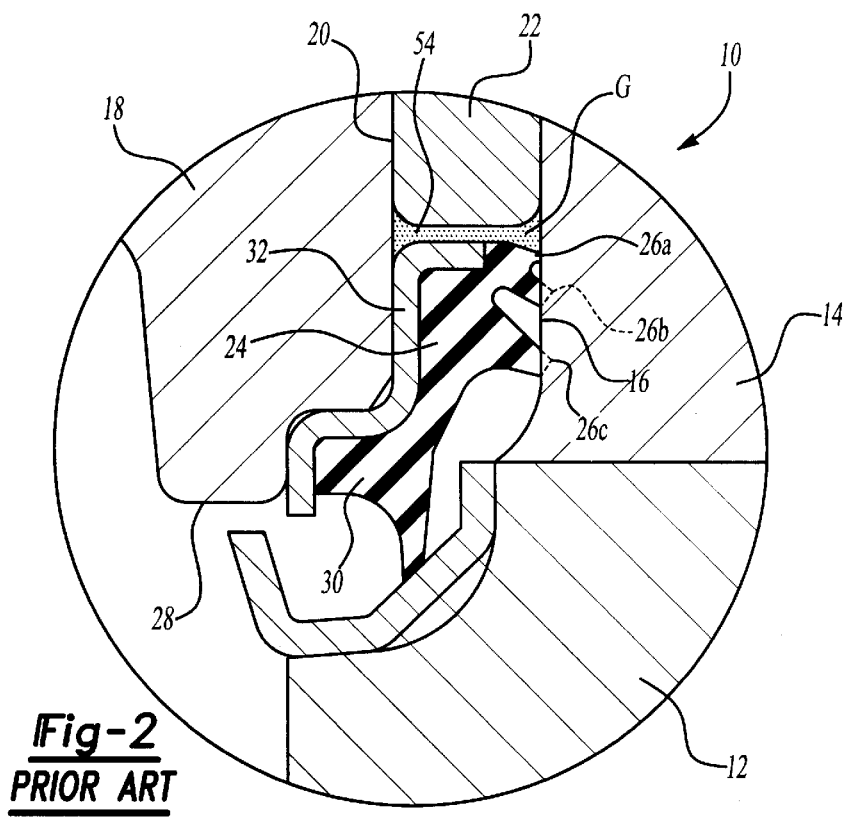
FIG. 2 illustrates a side cross sectional view of a prior art grease lock seal with the seal lips angled away from the internal bearing components.

FIG. 2 illustrates a prior art grease lock seal 24. The annular grease lock seal 24 includes sealing lips 26a, 26b, 26c which are angled away from the needle roller bearings 22 and which contact the outer bearing surface 16 of trunnion 14. As internal pressure increases in the bearing cup assembly 10 because of either re-greasing or centrifugal forces which are introduced during the rotational operation of the assembly 10, the sealing lips 26a, 26b 26c lose contact with the outer bearing surface 16 of the trunnion 14, allowing grease to escape from the assembly 10. This assembly 10 does not allow long term retention of grease G, and thus, the universal joint must be re-greased as grease G is purged.

Figure 3:
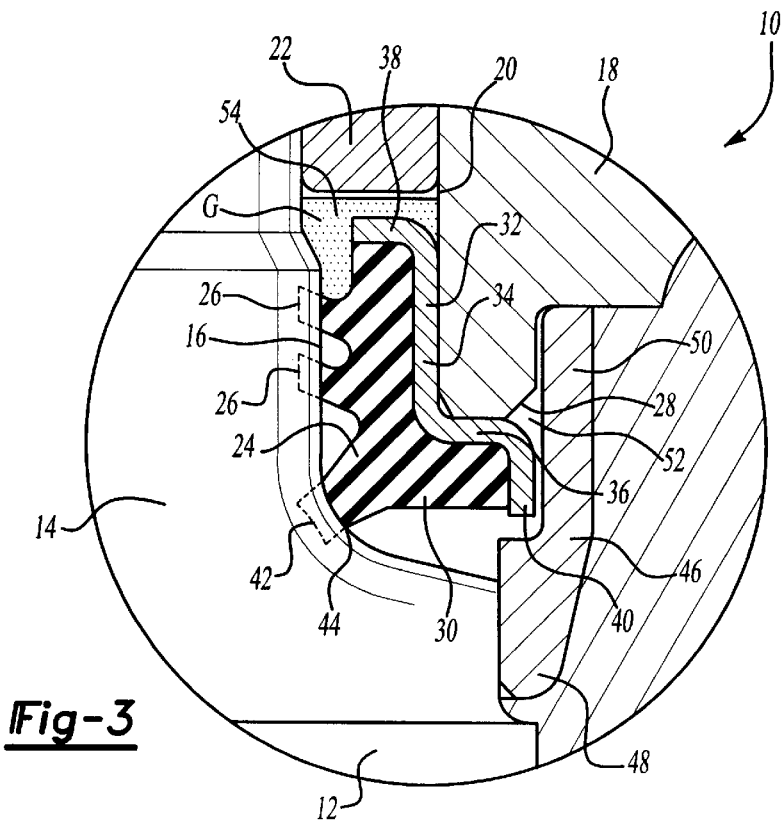
FIG. 3 illustrates a side cross sectional view of the grease lock seal of the present invention with the seal lips angled inward toward the internal bearing components.

At times, it is desirous to retain grease G in the bearing cup assembly 10 so as to eliminate the step of relubrication. FIG. 3 illustrates the bearing cup assembly 10 of the present invention which permits permanent retention of grease G. The grease lock seal 24 is press fit within the bearing cup assembly 10 to retain grease G and includes a seal portion 30 bonded to a metal housing 32. The metal housing 32 has an axially extending portion 34 with a lower radially outwardly extending flange portion 36 and an upper radially inwardly extending flange portion 38. A lower axially extending flange 40 extends from the lower radially outwardly extending flange portion 36. The axially extending portion 34 has an outer diameter substantially equal to the inner diameter of the inner bearing surface 20 of the bearing cup 18, and being pressed therein. The lower radially outwardly extending flange 36 contacts the open end 28 of the bearing cup 18 and functions as a stop when the grease lock seal 24 is pressed into the bearing cup 18.

The grease lock seal 24 also includes a seal portion 30 that is disposed within the metal housing 32. The seal portion 30 includes a plurality of sealing lips 26 angled inwardly towards the needle roller bearings 22. The free position of the lips 26 and a flange 42 is shown in phantom. The lips 26 are deformed away from this free position by the trunnion 14. The plurality of sealing lips 26 substantially contact the outer surface 16 of the trunnion 14 to prevent grease G from purging.

The seal portion 30 further includes a shoulder flange 42 located proximate to the plurality of sealing lips 26, but distal from the needle roller bearings 22. The shoulder flange 42 is compressed on the shoulder 44 of the outer surface 16 of the trunnion 14 to form a compression seal. The compression seal prevents contaminants such as dust, dirt, and water from contacting the plurality of sealing lips 26 and contaminating the grease G.

The bearing cup assembly 10 further includes an annular deflector 46. The deflector 46 has an body portion 48 and a finger portion 50. The body portion 48 has an inner diameter such that the body portion 48 contacts the outer bearing surface 16 of the trunnion 14, creating an interference fit. A cavity 52 for containing grease G is formed in the space between the bearing cup 18, the finger portion 50 of the deflector 46 and the metal housing 32. An exit channel 60 extends from the cavity 52, over the finger portion 50 of the deflector 46, leading out of the assembly 10.

Grease G is accumulated in the grease chamber 54 located above the plurality of sealing lips 26. Because the sealing lips 26 are angled upwardly towards the needle roller bearings 22, grease G is retained in the grease chamber 54 and does not purge from the assembly 10. Furthermore, as the bearing cup 18 is rotated, the centrifugal forces which act on the assembly 10 cause the contact pressure of the sealing lips 26 on the trunnion 14 to increase, which further helps to retain the grease G in both the grease chamber 54 and in the assembly 10. Because the grease G is permanently retained in the grease chamber 54, the assembly 10 does not have to be re-greased.

However, at times it is desirable to have the ability to re-grease the assembly 10. For one, customers often demand the ability to re-grease. Additionally, it is also desirable to re-grease when operating under off highway conditions because dirt and dust accumulates in the grease G.

Figure 4:
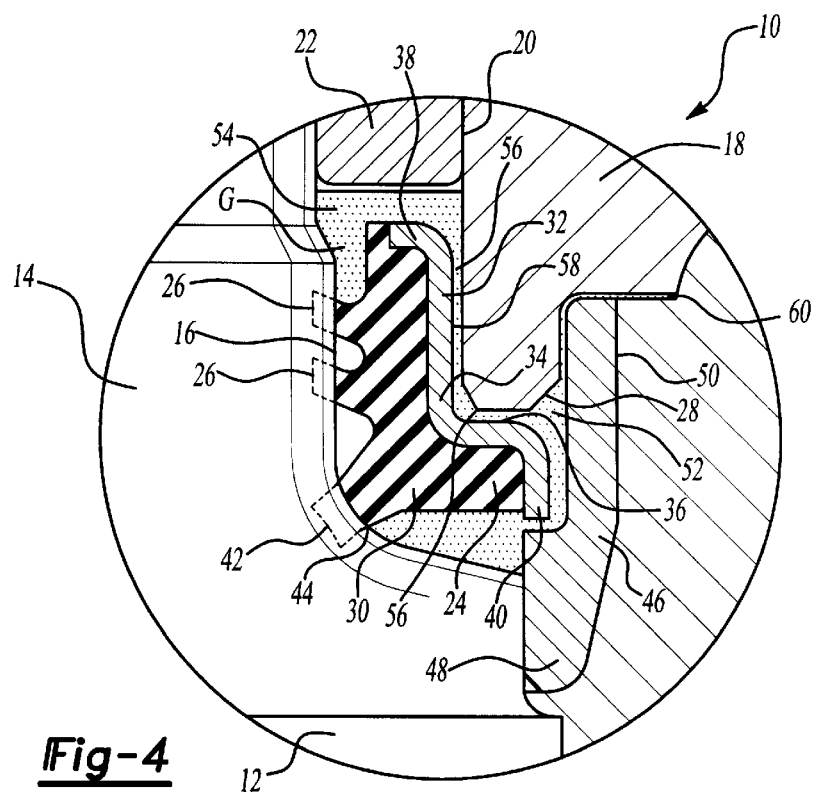
FIG. 4 illustrates a side cross sectional view of an alternative embodiment of the grease lock seal of the present invention employing grease purge channels.
Figure 5:
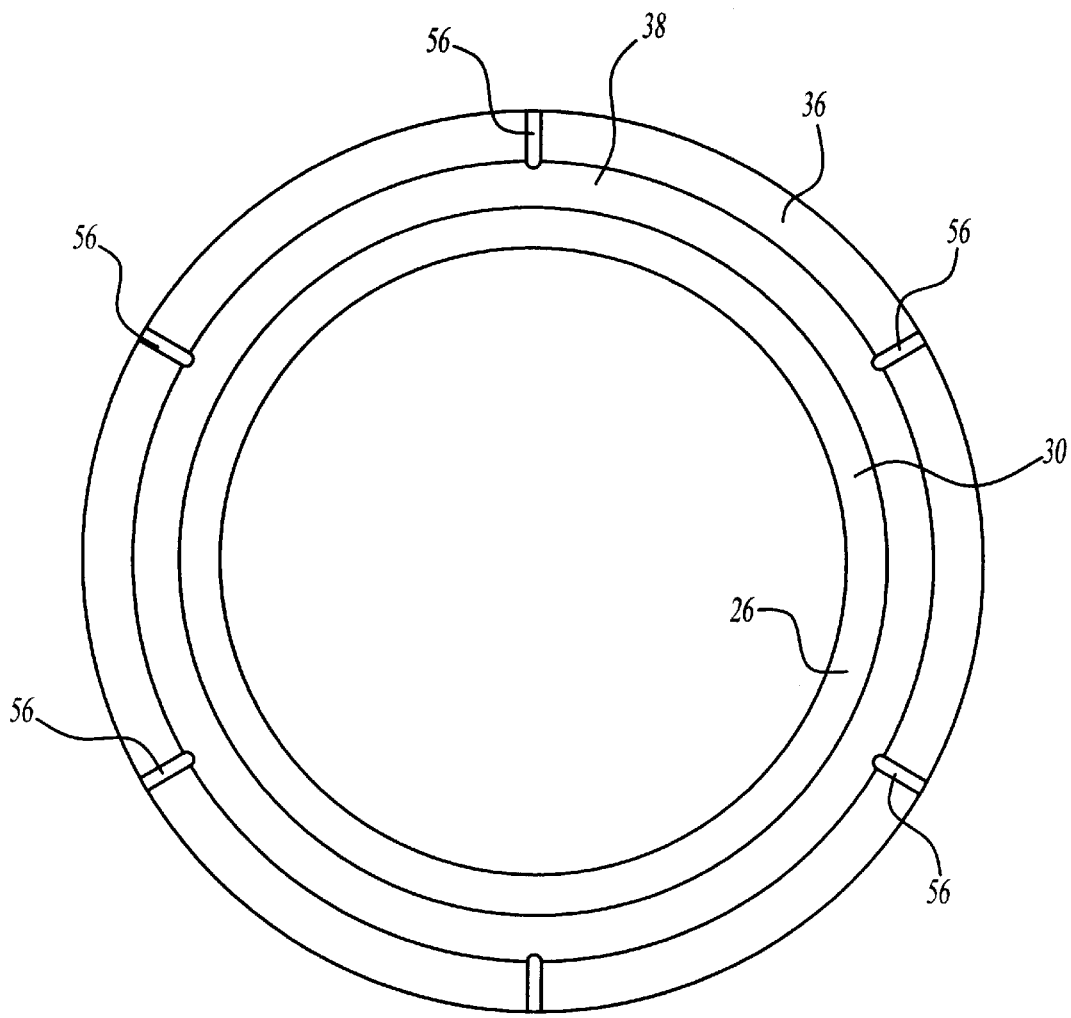
FIG. 5 illustrates a top view of a grease lock seal with grease purge channels formed on the outer surface of the metal housing.

In another embodiment of the present invention, as illustrated in FIG. 4, a plurality of grease purge channels 56 are formed on the outer surface 58 of the metal housing 32 of the grease lock seal 24. In the preferred embodiment, as shown in FIG. 5, six grease purge channels 56 equally spaced are employed. Although in the preferred embodiment six channels 56 are utilized, it is to be understood that any number of channels can be used.

The grease purge channels 56 have a substantially semi-circular cross section. The channels 56 are large enough to allow used grease G to flow out of the assembly 10 during re-greasing, but are too small to allow grease G to escape from the assembly 10 during normal rotational operational conditions.

When re-greasing the assembly 10, such as by a grease gun, the new grease G is added to the grease chamber 54 through a port, purging the used grease G out of the chamber 54 and through the grease purge channels 56. As the used grease G accumulates in the cavity 52, the increase in pressure caused by the addition of new grease G purges the old grease G out of the cavity 52, through the exit channels 60, and out of the assembly 10.

Accordingly, the present invention provides grease lock seal 24 with sealing lips 26 that are angled inwardly toward the internal bearing components. The inwardly angled sealing lips 26 retain grease G in the assembly 10 as the internal pressure within the assembly 10 increases. By retaining grease G in the system, little or no maintenance is required. However, if re-greasing is desired, a plurality of grease purge channel 56 can be added to the grease lock seal 24 to allow for the option of regreasing.

The foregoing description is exemplary rather then defined by the limitations within. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A bearing assembly comprising:
   a trunnion having an outer bearing surface;
   a bearing cup having an inner bearing surface, said bearing cup being co-axially disposed about said outer bearing surface of said trunnion;
   a plurality of bearings disposed between said inner bearing surface of said bearing cup and said outer bearing surface of said trunnion for allowing rotation of said bearing cup in relation to said trunnion; and
   a grease lock seal having an annular seal portion and an annular housing attached thereto, said seal portion having at least one projection being angled toward said bearing cup assembly and substantially contacting said outer bearing surface of said trunnion to create a seal to prevent purging of a lubricant from a lubricant chamber located above said at least one projection.

2. The bearing assembly as recited in claim 1 wherein said seal portion further comprises an annular shoulder flange which substantially contacts said outer bearing surface of said trunnion to prevent contaminants from contacting said at least one projection.

3. The bearing assembly as recited in claim 1 wherein said assembly further comprises an annular deflector press fit into said bearing cup assembly, said deflector having an inner diameter which substantially contacts said outer bearing surface of said trunnion to create an interference fit.

4. The bearing assembly as recited in claim 1 wherein said housing further includes an upper edge, a lower edge, and a plurality of longitudinal grooves form on an outer surface of said housing, said plurality of longitudinal grooves running from said upper edge to said lower edge of said housing.

5. The bearing assembly as recited in claim 1 wherein said seal portion is comprised of rubber.

6. The bearing assembly as recited in claim 1 wherein said housing is comprised of metal.

7. A grease lock seal for use with a bearing assembly on a universal joint comprising:

an annular seal portion having at least one projection being angled toward said bearing cup assembly; and an annular housing attached to said seal portion having an upper edge, a lower edge and a plurality of longitudinal grooves formed on an outer surface of said housing, said plurality of longitudinal grooves running from said upper edge to said lower edge of said housing.

8. The grease lock seal as recited in claim 7 wherein there are six longitudinal grooves equally spaced about a central axis of said grease lock seal.

9. The grease lock seal as recited in claim 7 wherein said seal portion further comprises an annular shoulder flange to prevent contaminants from contacting said at least one projection.

10. The grease lock seal as recited in claim 7 wherein said seal portion is comprised of rubber.

11. The grease lock seal as recited in claim 7 wherein said housing is comprised of metal.

12. A bearing assembly comprising:

a trunnion having an outer bearing surface;

a bearing cup having an inner bearing surface, said bearing cup being co-axially disposed about said outer bearing surface of said trunnion;

a plurality of bearings disposed between said inner bearing surface of said bearing cup and said outer bearing surface of said trunnion for allowing rotation of said bearing cup in relative to said trunnion; and a grease lock seal having an annular seal portion and an annular housing attached thereto, said seal portion having at least one projection being angled toward said bearing cup assembly and substantially contacting said outer bearing surface of said trunnion to create a seal, to prevent purging of a lubricant from a lubricant chamber located above said at least one protrusion, and said housing having an upper edge, a lower edge, and a plurality of longitudinal grooves formed on an outer surface of said housing, said plurality of longitudinal grooves running from said upper edge to said lower edge of said housing.

13. The bearing assembly as recited in claim 12 wherein there are six longitudinal grooves equally spaced about a central axis of said grease lock seal.

14. The bearing assembly as recited in claim 12 wherein said seal portion further comprises an annular shoulder flange which substantially contacts said outer bearing surface of said trunnion to prevent contaminants from contacting said at least one projection.

15. The bearing assembly as recited in claim 12 wherein said assembly further comprises an annular deflector press fit into said bearing cup assembly, said deflector having an inner diameter which substantially contacts said outer bearing surface of said trunnion to create an interference fit.

16. The bearing assembly as recited in claim 12 wherein said seal portion is comprised of rubber.

17. The bearing assembly as recited in claim 12 wherein said housing is comprised of metal.

* * * * *